United States Patent
Khurshudov et al.

(10) Patent No.: US 7,382,565 B2
(45) Date of Patent: Jun. 3, 2008

(54) METHOD TO AVOID CONTACT BETWEEN THE HEAD AND DISK PROTRUSIONS

(75) Inventors: Andrei Khurshudov, San Jose, CA (US); Brian Strom, Cupertino, CA (US)

(73) Assignee: Samsung Electronics Co., Ltd, Suwon (KR)

( * ) Notice: Subject to any disclaimer, the term of this patent is extended or adjusted under 35 U.S.C. 154(b) by 149 days.

(21) Appl. No.: 11/103,993

(22) Filed: Apr. 11, 2005

(65) Prior Publication Data
US 2006/0227452 A1    Oct. 12, 2006

(51) Int. Cl.
*G11B 21/02* (2006.01)

(52) U.S. Cl. ...................................................... 360/75
(58) Field of Classification Search ............. 360/78.04, 360/75, 31, 77.02, 77.04, 77.07; 711/112; 386/125; 714/8, 710
See application file for complete search history.

(56) References Cited

U.S. PATENT DOCUMENTS

| | | | |
|---|---|---|---|
| 4,680,703 A * | 7/1987 | Kriz | 711/112 |
| 5,150,266 A * | 9/1992 | Albert | 360/78.04 |
| 5,796,546 A * | 8/1998 | Sasamoto et al. | 360/78.04 |
| 6,411,458 B1 * | 6/2002 | Billings et al. | 360/75 |
| 6,442,715 B1 * | 8/2002 | Wilson | 714/710 |
| 6,671,110 B2 * | 12/2003 | Baba et al. | 360/31 |
| 6,771,440 B2 * | 8/2004 | Smith | 360/31 |
| 6,842,580 B1 * | 1/2005 | Ueda et al. | 386/125 |
| 6,868,477 B2 * | 3/2005 | Hoskins et al. | 711/112 |
| 6,925,580 B2 * | 8/2005 | Hoskins | 714/8 |
| 7,143,309 B2 * | 11/2006 | Yoshida | 714/8 |

* cited by examiner

*Primary Examiner*—Fred Tzeng
(74) *Attorney, Agent, or Firm*—Ben J. Yorks; Irell & Manella LLP

(57) ABSTRACT

A hard disk drive with a controller that controls a movement of a head relative to a disk. The controller causes the head to avoid a defect on the disk during a seek routine. The location of the defect is previously identified and stored in the drive. The drive may create a "no-fly" zone about the defect to insure no contact with the head. The no-fly zone can be avoided by delaying the start of a seek routine, varying the displacement profile of the head or other techniques.

20 Claims, 3 Drawing Sheets

FIG. 3
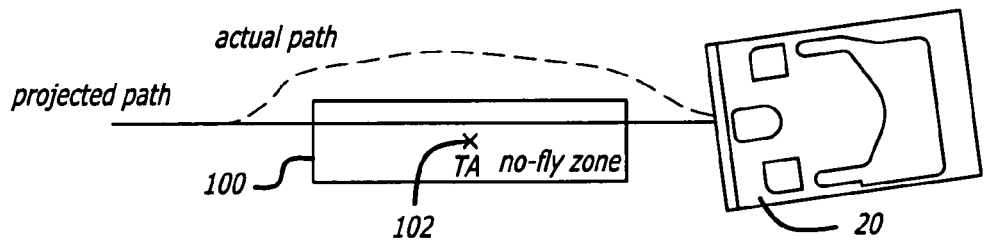
FIG. 4
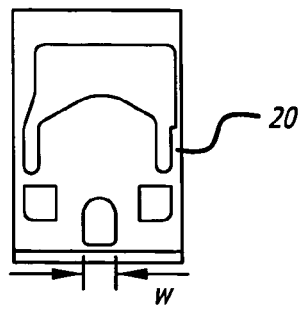
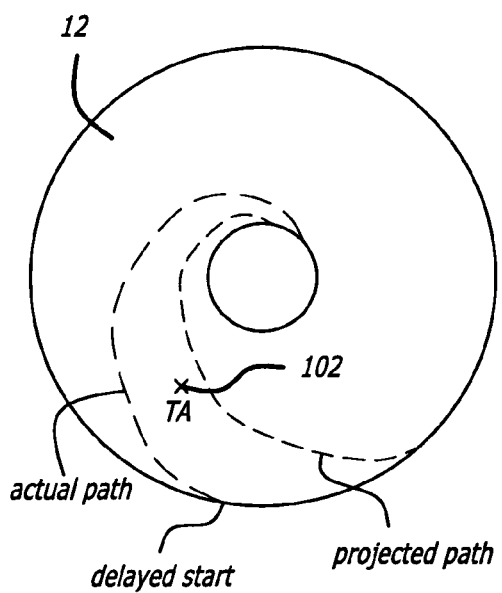
FIG. 5
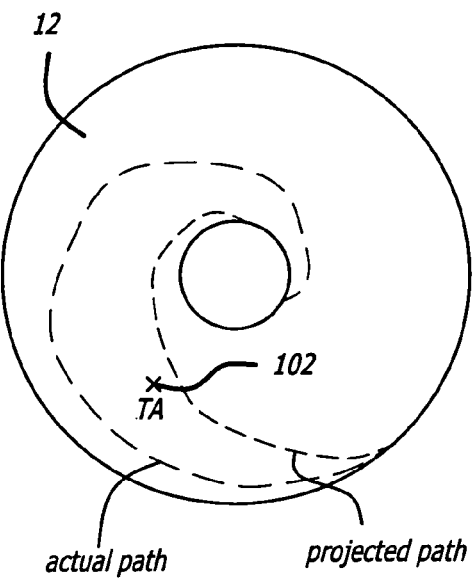
FIG. 6

METHOD TO AVOID CONTACT BETWEEN THE HEAD AND DISK PROTRUSIONS

BACKGROUND OF THE INVENTION

1. Field of the Invention

The present invention relates to a seek routine in a hard disk drive.

2. Background Information

Hard disk drives contain a plurality of magnetic heads that are coupled to rotating disks. The heads can magnetize and sense the magnetic fields of the disks to write and read data, respectively. The heads each have an air bearing surface that cooperates with a flow of air generated by the rotating disk to create an air bearing. The air bearing prevents mechanical wear between the head and the disk.

The data is typically stored on annular tracks that extend radially across each disk surface. To access data in different tracks the drive moves the heads across the disk surfaces in accordance with a seek routine. The seek routine is typically performed in accordance with a program performed by the controller of the disk drive.

The surface of the disk may have protrusions caused by disk defects or contaminants embedded into the disk surface. Impact between the head and the protrusion may create heat that degrades the read back signal. This phenomenon is sometimes referred to as a thermal asperity. Additionally, impact may create instability in the air bearing and cause an erroneous reading or writing of data. For this reason most disk drives identify such protrusions and avoid reading or writing in the protruded areas.

During a seek routine the heads are moved across the disk surfaces without regard to whether a protrusion(s) is in the seek path. Impact or multiple impacts with a protrusion during a seek routine could scratch the head or disk. The scratch could be extended over a larger area of the disk if a particle is dragged across the disk surface by the head. Additionally, impact can also produce head instability and cause an erroneous reading or writing of data. It would be desirable to provide a seek routine that avoids protrusions in the disk surfaces.

BRIEF SUMMARY OF THE INVENTION

A hard disk drive with a controller that controls a movement of a head relative to a disk. The controller causes the head to avoid a defect on the disk during a seek routine.

BRIEF DESCRIPTION OF THE DRAWINGS

FIG. 3 is an illustration showing a head avoiding a no-fly zone of a disk;

FIG. 4 is a bottom view of a head;

FIG. 5 is an illustration showing a path of a head in a delayed seek routine;

FIG. 6 is an illustration showing a path of a head in a seek routine with a varying head displacement profile.

DETAILED DESCRIPTION

Disclosed is a hard disk drive with a controller that controls a movement of a head relative to a disk. The controller causes the head to avoid a defect on the disk during a seek routine. The location of the defect is previously identified and stored in the drive. The drive may create a "no-fly" zone about the defect to insure no contact with the head. The no-fly zone can be avoided by delaying the start of a seek routine, varying the displacement profile of the head, or other techniques.

Figure 1:
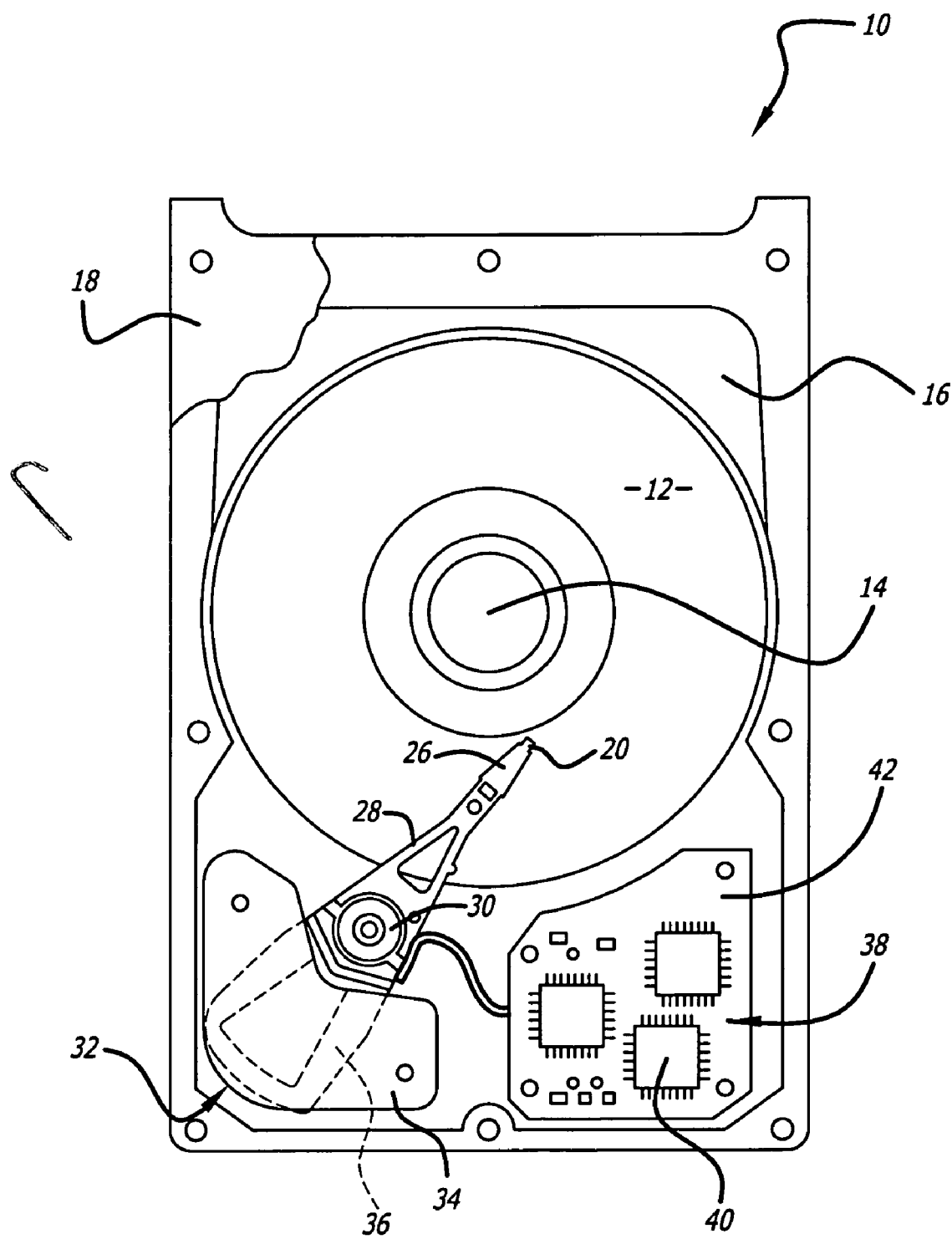
FIG. 1 is a top sectional view of the hard disk drive.

Referring to the drawings more particularly by reference numbers, FIG. 1 shows an embodiment of a hard disk drive 10. The disk drive 10 may include one or more magnetic disks 12 that are rotated by a spindle motor 14. The spindle motor 14 may be mounted to a base plate 16. The disk drive 10 may further have a cover 18 that encloses the disks 12.

The disk drive 10 may include a plurality of heads 20 located adjacent to the disks 12. Each head 20 may have separate write (not shown) and read elements (not shown). The heads 20 are gimbal mounted to a corresponding flexure arm 26. The flexure arms 26 are attached to an actuator arm 28 that is pivotally mounted to the base plate 16 by a bearing assembly 30. A voice coil 32 is attached to the actuator arm 28. The voice coil 32 is coupled to a magnet assembly 34 to create a voice coil motor (VCM) 36. Providing a current to the voice coil 32 will create a torque that swings the actuator arm 28 and moves the heads 20 across the disks 12. The actuator arm 28 and flexure arms 26 can collectively be referred to as an actuator arm assembly.

The hard disk drive 10 may include a printed circuit board assembly 38 that includes a plurality of integrated circuits 40 coupled to a printed circuit board 42. The printed circuit board 42 is coupled to the voice coil 32, heads 20 and spindle motor 14. The cover 18 and base plate 16 enclose the disk 12 and heads 20 of the disk drive 10.

Figure 2:
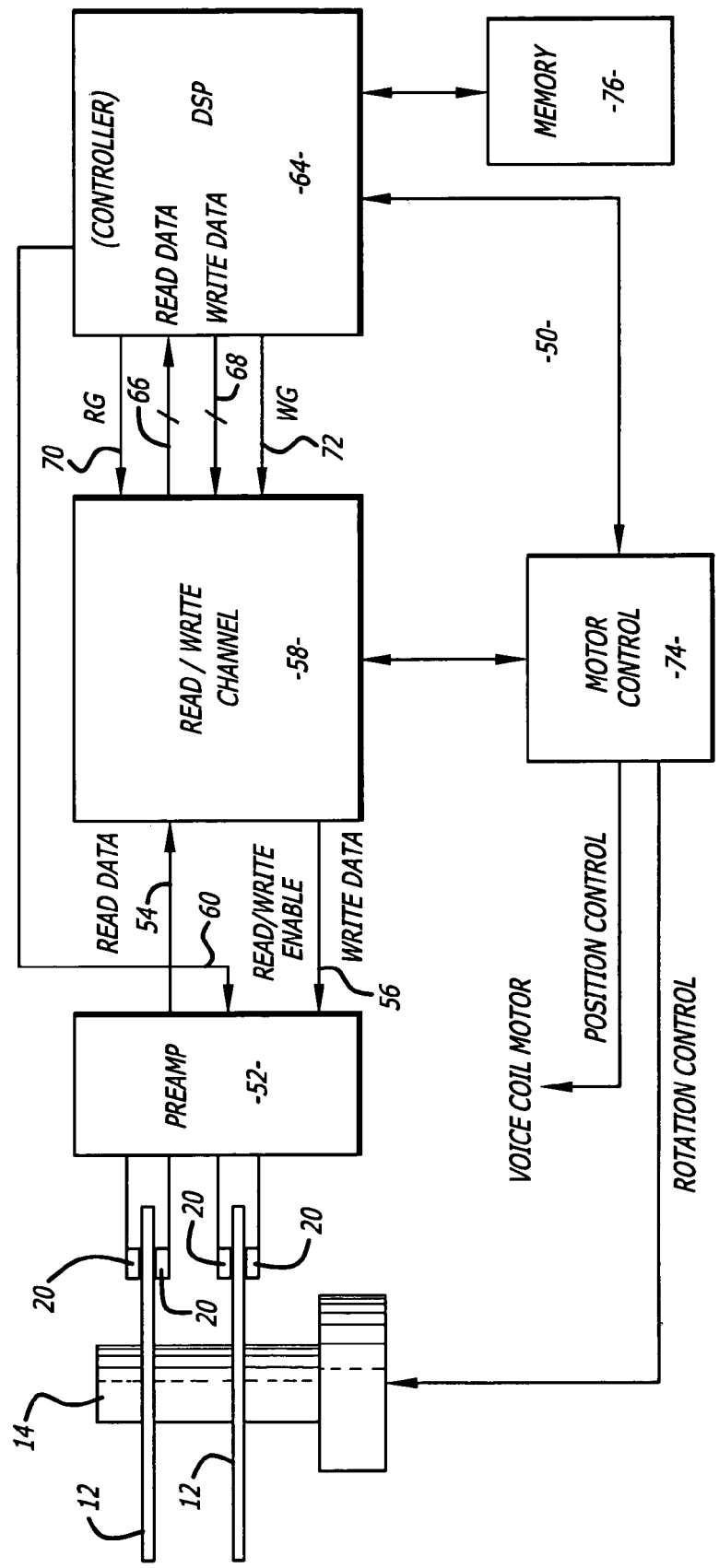
FIG. 2 is a schematic of an electrical circuit for the hard disk drive.

FIG. 2 shows an electrical circuit 50 for reading and writing data onto the disks 12. The circuit 50 may include a pre-amplifier circuit 52 that is coupled to the heads 20. The pre-amplifier circuit 52 has a read data channel 54 and a write data channel 56 that are connected to a read/write channel circuit 58. The pre-amplifier 52 also has a read/write enable gate 60 connected to a controller 64. Data can be written onto the disks 12, or read from the disks 12 by enabling the read/write enable gate 60.

The read/write channel circuit 58 is connected to a controller 64 through read and write channels 66 and 68, respectively, and read and write gates 70 and 72, respectively. The read gate 70 is enabled when data is to be read from the disks 12. The write gate 72 is to be enabled when writing data to the disks 12. The controller 64 may be a digital signal processor that operates in accordance with a firmware and/or software routine(s), including a routine(s) to write and read data from the disks 12. The read/write channel circuit 58 and controller 64 may also be connected to a motor control circuit 74 which controls the voice coil motor 36 and spindle motor 14 of the disk drive 10. The controller 64 may be connected to a non-volatile memory device 76. By way of example, the device 76 may be a read only memory ("ROM"). The non-volatile memory 76 may contain the firmware and/or software routine(s) performed by the controller 64. By way of example, the routines may include a seek routine which is performed by the controller 64 to cause the head 20 to move across the disk 12.

Disk defects such as protrusions in the disk surfaces 12 may be identified before the final assembly of the disk drive 10. Additionally, the defects can be determined after the drive is assembled. The location of the defects can be stored in either the memory or the disks of the drive. A defect may be a disk protrusion, or a contaminant that has deposited onto the disk surface.

As shown in FIG. 3 a "no-fly zone" 100 may be mapped around one or more defects 102. During a seek routine the controller causes the head 20 to avoid the zone 100 to prevent impact between the head and the defect. The zone 100 may have a width that is at least the width W of the air bearing surface of the head (see FIG. 4). By way of example, if the air bearing surface is 150 microns wide and the track spacing is 0.2 microns, then the zone 100 could be 750 tracks wide.

To the avoid the defect, or no-fly zone, the controller can initially project the path of the head, and then delay the initiation of the seek routine if the projected path extends onto the defect 102 or into the zone 100. This approach is shown in FIG. 5.

Alternatively, the controller can vary the head displacement profile to avoid the defect 102, or zone 100 as shown in FIG. 6. The head displacement profile can be varied by modifying the velocity profile of the seek routine.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A hard disk drive, comprising:
    a base plate;
    a spindle motor coupled to said base plate;
    a disk coupled to said spindle motor, said disk has an inner diameter and an outer diameter, said disk having a defect;
    an actuator arm assembly coupled to said base plate;
    a voice coil motor coupled to said actuator arm assembly;
    a head structurally coupled to said actuator arm assembly and magnetically coupled to said disk; and,
    a controller that is coupled to said voice coil motor, said controller controls a movement of said head between said inner and outer diameters of said disk to purposely avoid flying over said defect on said disk during a seek routine to any track of said disk.

2. The disk drive of claim 1, wherein said controller avoids the defect by delaying said seek routine.

3. The disk drive of claim 1, wherein said controller avoids the defect by varying a head displacement profile.

4. The disk drive of claim 1, wherein said controller establishes a zone about the defect that is avoided during said seek routine.

5. The disk drive of claim 4, wherein said zone is dependent upon an air bearing width of said head.

6. A hard disk drive, comprising:
    a base plate;
    a spindle motor coupled to said base plate;
    a disk coupled to said spindle motor, said disk has an inner diameter and an outer diameter, said disk having a defect;
    an actuator arm assembly coupled to said base plate;
    a voice coil motor coupled to said actuator arm assembly;
    a head structurally coupled to said actuator arm assembly and magnetically coupled to said disk; and,
    controller means for controlling a motion of said head between said inner and outer diameters of said disk to purposely avoid flying over a defect on said disk during a seek routine to any track of said disk.

7. The disk drive of claim 6, wherein said controller means avoids the defect by delaying said seek routine.

8. The disk drive of claim 6, wherein said controller means avoids the defect by varying a head displacement profile.

9. The disk drive of claim 6, wherein said controller means establishes a zone about the defect that is avoided during said seek routine.

10. The disk drive of claim 9, wherein said zone is dependent upon an air bearing width of said head.

11. A program storage medium that causes a controller of a hard disk drive to perform a seek routine, comprising:
    a program storage medium that causes a controller to perform a seek routine between an inner diameter and an outer diameter of a disk to any track of said disk, that purposely avoids flying over a defect on the disk.

12. The storage medium of claim 11, wherein said program storage medium causes said controller to avoid the defect by delaying the seek routine.

13. The storage medium of claim 11, wherein program said storage medium causes said controller to avoid the defect by varying a head displacement profile.

14. The storage medium of claim 11, wherein program storage medium causes said controller to avoid a zone about the defect during the seek routine.

15. The storage medium of claim 14, wherein said zone is dependent upon an air bearing width of a head that is magnetically coupled to the disk.

16. A method for performing a seek routine in a hard disk drive, comprising:
    moving a head between an inner diameter and an outer diameter of a disk in a seek routine to any track of the disk, in a manner that purposely avoids flying over a defect on the disk.

17. The method of claim 16, wherein the defect is avoided by delaying the seek routine.

18. The method of claim 16, wherein the defect is avoided by varying a head displacement profile.

19. The method of claim 16, wherein a zone about the defect is avoided during the seek routine.

20. The method of claim 19, wherein the zone is dependent upon an air bearing width of the head.

\* \* \* \* \*